US012722718B2

(12) United States Patent
Moore

(10) Patent No.: US 12,722,718 B2
(45) Date of Patent: Sep. 1, 2026

(54) CAVITY SEALING SYSTEM FOR AUTOMOTIVE VEHICLES

(71) Applicant: Zephyros, Inc., Romeo, MI (US)

(72) Inventor: Patrick Moore, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 350 days.

(21) Appl. No.: 18/494,251

(22) Filed: Oct. 25, 2023

(65) Prior Publication Data

US 2024/0059359 A1 Feb. 22, 2024

Related U.S. Application Data

(63) Continuation of application No. 16/316,808, filed as application No. PCT/IB2017/000896 on Aug. 1, 2017, now abandoned.

(30) Foreign Application Priority Data

Aug. 5, 2016 (EP) .................................... 16183084

(51) Int. Cl.
*B62D 29/00* (2006.01)
*B60R 13/08* (2006.01)
*C08J 9/00* (2006.01)

(52) U.S. Cl.
CPC ........ *B62D 29/002* (2013.01); *B60R 13/0815* (2013.01); *C08J 9/0061* (2013.01); *C08J 2323/08* (2013.01); *C08J 2423/08* (2013.01)

(58) Field of Classification Search
CPC .. B62D 29/002; B60R 13/0815; C08J 9/0061; C08J 2323/08; C08J 2423/08
USPC .......................................................... 296/191
See application file for complete search history.

(56) References Cited

U.S. PATENT DOCUMENTS 6,368,438 B1 * 4/2002 Chang ........................ C08J 9/16 521/135
10,899,902 B2 * 1/2021 Wolschleger ........... C08L 23/08
2003/0062739 A1 4/2003 Bock
2006/0127584 A1 6/2006 Lande et al.
2007/0034432 A1 * 2/2007 Rosenberg ........... B62D 29/002 180/89.1
2008/0029214 A1 2/2008 Hable et al.
2012/0171372 A1 7/2012 Looi
2013/0186551 A1 7/2013 Henry et al.

FOREIGN PATENT DOCUMENTS

CN 103180399 A 6/2013
EP 0611778 A2 8/1994
EP 1307356 A1 7/2003
JP 2008/095071 A 4/2008
KR 10-2013-0141487 12/2013
WO 02/012026 A1 2/2002
WO 2012/041513 A1 4/2012
WO 2015/175896 A1 11/2015

OTHER PUBLICATIONS

Korean Decision of Final Rejection dated Aug. 25, 2022, Application No. 10-2021-7040849.
Chinese Decision of Rejection dated Jun. 20, 2022, Application No. 201780047087.X.
Korean Notice of Decision of Final Rejection dated Aug. 10, 2021, Application No. 10-2019-7002259.
Korean Office Action dated Feb. 19, 2021, Application No. 10-2019-7002259.
Chinese Second Office Action (Abstract) dated Nov. 12, 2021, Application No. 201780047087.X.
Korean Notice of Decision of Final Rejection dated Oct. 12, 2021, Application No. 10-2019-7002259.
India First Examination Report dated Jun. 14, 2021, Application No. IN201937001487.
Chinese First Office Action dated Dec. 28, 2020, Application No. CN201780047087.X.

* cited by examiner

*Primary Examiner* — Steven O Douglas
(74) *Attorney, Agent, or Firm* — The Dobrusin Law Firm, P.C.

(57) ABSTRACT

The present invention relates to a system for scaling a cavity of an automotive vehicle frame, wherein a wall is associated with an automotive vehicle structure; and an expandable material is disposed by an extruder over at least a portion of said wall and in contact with said wall prior to expansion of said expandable material, wherein the expansion rate of the expandable material is at least 400% when exposed to heat usually provided to the vehicle frame during automotive vehicle production and wherein the expandable material is prior and after its disposition to said wall dry to the touch at ambient temperature.

10 Claims, No Drawings

CAVITY SEALING SYSTEM FOR AUTOMOTIVE VEHICLES

FIELD OF THE INVENTION

The present invention relates generally to a cavity sealing, for example for improving sound absorption in an automotive vehicle, for improving the stiffness of a vehicle and/or to avoid entry of undesired component like air, dust and/or moisture into the frame. More particularly, the invention relates to an automotive vehicle body in white system.

BACKGROUND OF THE INVENTION

The transportation industry continues to require methods of baffling, reinforcement and sealing that provide improved functionality while simultaneously providing reduced weight and cost. One technique to reduce these problems has been to employ baffle structures, within hollow cavities of the body in white construction, for effectively blocking sound propagation through the sheet metal cavities and/or avoid undesired component like air, dust and/or moisture-entry into the frame. However, there is a constant need to further reduce the noise and/or to increase the stiffness of the frame of a vehicle and/or to further reduce the undesired component like air, dust and/or moisture-entry into the frame.

It is therefore the problem of the present invention to provide an improved system for sealing a cavity of an automotive vehicle frame.

SUMMARY OF THE INVENTION

This problem is attained by a system for sealing a cavity of an automotive vehicle frame, comprising:

(a) a wall associated with an automotive vehicle structure; and (b) an expandable material disposed by an extruder over at least a portion of said wall and in contact with said wall prior to expansion of said expandable material, wherein the expansion rate of the expandable material is ≥400%, preferably ≥800% or >800%, more preferably ≥1000%, when exposed to heat usually provided to the vehicle frame during automotive vehicle production and wherein the expandable material is prior and after its disposition to said wall dry to the touch at ambient temperature.

The present invention is directed to the sealing of a cavity, and particularly one for automotive vehicle body in white structures, such as vehicle roof-rails and pillar structures or the like. The system generally employs a substrate that is coated, preferably by extrusion, over a portion of its surface, with an expandable material, and particularly a heat activated resinous expandable material. Preferably, the expandable material is provided as pellets which are fed to an extruded. At the outlet of the extruder, the expandable material is provided as a bead, which is directly applied to the wag. For this application the extruder and/or the wall are moved relative to each other.

The expandable material is applied to the wall of an automotive vehicle structure by an extruder. Preferably this extruder is attached to a robot, which moves the extruder relative to the wall. This application can be supported by visualization means, for example a camera, which takes pictures of the bead of expandable material applied. An attached computer system can analyze whether the expandable material is in the right location and/or has the correct shape.

Preferably, the expandable material is, prior and after its application to the wall and before it is expanded dry to the touch at ambient temperature, i.e. a temperature around 20° C., which means that it can be handled and or the parts can be stacked without sticking together.

In a particular preferred embodiment, the substrate is an inner wag of a metal, plastic or composite vehicle body member, and it is partially coated with a heat activated polymer, e.g., a formable hot melt adhesive based polymer or an expandable structural foam, examples of which include olefinic polymers, vinyl polymers, thermoplastic rubber-containing polymers, epoxies, urethanes or the like.

According to the present invention the expansion rate of the expandable material is at least 400%, preferably at least 800%, more preferably at least 1000% or even more. This assures a proper sealing of the structure against undesired component like air, dust and/or moisture, improves the noise reduction and/or improves the structural properties of the frame. The expansion of the expandable material is utilized by heat, which is usually provided to the vehicle frame during automotive vehicle production, for example during the cataphoresis treatment or the coating of the vehicle frame with a color.

In one preferred embodiment the expandable material is placed on or adjacent one or more inner walls defining a cavity within an automotive vehicle body in white, such as a vehicle roof rails, pillars, rockers or otherwise. The expandable material is activated to accomplish transformation (e.g., expansion or flow) of the polymer within the cavity.

Preferably, said wall defines a cavity of an automotive vehicle body in white. More preferably, the wall is an interior wall surface of a vehicle pillar.

Preferably, said expandable material is a heat activated thermoplastic foamable material.

More preferably, the said expandable material is an acoustical-, a structural- and/or a sealing-polymer.

Preferably, the wall includes an exposed surface.

According to a preferred embodiment of the present invention, said wall is an interior wall of a hollow structural member.

Preferably, said wall is an automotive vehicle body panel or reinforcement member.

Preferably, the adhesion-properties between the wall and the expandable material are between 0.25 to 1.5 $N/mm^2$, preferably 0.5 to 1 $N/mm^2$ depending the state of the surface and the material of the wall.

The present invention has the following advantages:

- The automatic application of the expandable material replaces a manual operation and is hence cheaper and more reliable.
- Prior to extrusion, the material is provided in pellet form and this easy to handle.
- The system does not require holes in the wall that can be difficult to obtain for example when the wall is made of a high strength steel and when the hole can weaker the wall and by extension the vehicle structure.

The expandable material is preferably a hot melt adhesive formulation comprising (i) one or more solid polymers (ii) a thixotropic filler (iii) a blowing agent system (iv) a cross linking system comprising a first cross linking agent having an activation temperature within the temperature range at which the adhesive is heated up to the foaming temperature to increase the melt viscosity of the adhesive to at temperatures within the bake phase and a second cross linking agent with an activation temperature within the range of the foaming temperature to cause the foamed formulation to cross link.

The temperature range at which after application the adhesive is heated up to the foaming temperature is referred to herein as the bake phase of the cycle. The invention reduces the tendency of the adhesive to sag and perhaps fall away from the substrate due to adhesive failure during this phase.

The adhesive wets the surface to which it is applied which improves the absorption of any oil and other contaminants on the surface to improve adhesion and here a low melt viscosity is required.

Use of the adhesive formulation of the invention therefore allows application of the adhesive to a substrate in one location to provide a substrate supporting a non-tacky heat activatable adhesive. The substrate may, if desired be transported to a second location where it can be assembled and the system heated through the bake cycle to cause foaming and the development of adhesive properties. Use of the adhesive of the invention has the benefit that the likelihood of adhesive failure between the adhesive and the substrate during the bake phase of the cycle is reduced.

This can be particularly useful in industries such as the automobile, rail and aircraft industries where components such as panels are prepared in one location and transported to another location for assembly. The adhesives are also particularly useful in the extrusion in place applications such as are described in United States Patent Publication 2006/0127584 where they may be applied by the techniques described in one location and then shipped elsewhere.

The presence of the first cross linking agent together with the thixotropic filer allows the formulation to be applied for example by melt coating such as extrusion at a low melt viscosity whilst retaining its shape, to adhere to a surface with sufficient strength and yet be dry to the touch when cool and to retain its adhesion to the substrate and its shape during the bake phase. It is preferred that the first cross linking agent has an activation temperature in the range 80° C. to 150° C., more preferably 100° C. to 130° C. It is also preferred that it have a relatively short half life within this temperature range.

The adhesive is formulated so that it will foam at a higher temperature than that at which it is applied to the substrate. The presence of the second cross linking agent which is activated at the higher foaming temperature will therefore be activated during the foaming stage to increase the viscosity to retain the gasses generated by the blowing agent and to provide strength to the foamed structure. It is preferred that second cross-linking agent has an activation temperature in the range 130° C. to 220° C. more preferably 140° C. to 180° C. and has a long half life at a temperature in the activation range of the first cross linking agent.

The polymers used in the present invention are preferably copolymers (and terpolymers) of ethylene. In particular, unsaturated esters such as vinyl esters and acrylic and methacrylic esters are effective. The term copolymer as used herein refers to polymers of two or more monomers. Particularly preferred are ethylene/acrylic ester copolymers and more particularly copolymers of ethylene and butyl acrylate preferably n-butyl acrylate. Examples of polymers that may be used include:

(i) Ethylene vinyl acetate copolymers
(ii) Ethylene methyl acrylate copolymers
(iii) Ethylene butyl acrylate copolymers
(iv) Ethylene 2 hexylethyl acrylate copolymers
(v) Polyamide polymers
(vi) Glycidyl methacrylate, acrylic ester, ethylene copolymers
(vii) Carboxylated ethylene methyl copolymers
(viii) Carboxylated ethylene butyl acrylate copolymers
(ix) Ethylene terpolymers
(x) Maleic anhydride grafted polymers.

The polymers may comprise from 30 to 90 wt % of the formulation, preferably 50 to 80 wt % and mixtures of these polymers may be used.

It is preferred to use a polymer blend containing an adhesion promoting resin in the blend and the preferred polymer system comprises:

(i) one or more of the ethylene/unsaturated ester copolymers and
(ii) an adhesion promoting resin.

The choice of the ethylene/unsaturated ester copolymers will depend upon the use to which the adhesive is to be put. However a particularly preferred mixture comprises two ethylene acrylate ester copolymers together with an ethylene vinyl acetate copolymer and an adhesion promoting resin. We have found that the use of a combination of a high melt index ethylene acrylate copolymer, an ethylene vinyl acetate copolymer and an adhesion promoting resin provides low melt viscosity at the application temperature and good adhesive properties to oily surfaces.

In particular we have found that an ethylene acrylate copolymer have a 320 g/10 min melt flow index (ISO 1133 190° C., 2.16 kg) combined with an ethylene vinyl acetate copolymer having a 800 g/10 min melt flow index, cohesive adhesion failure can be obtained.

The inclusion of the first cross linking agent and the thixotropic filler further providing a dry to the touch adhesive after application which can be expanded to produce an adhesive foam with good retention properties. The adhesion promoting resins may be any of those known in the art and may be aliphatic or aromatic hydrocarbon resins or may be natural terpene based resins. Preferred resins are those sold by CRAY VALLEY under the trade name Norsolene in particular the aromatic resins of softening point in the range 95 to 115° C. such as Norsolene S105. The presence of the ethylene vinyl acetate copolymer together with the adhesion promoting resin provides a formulation with a relatively low yield point and melt viscosity which then allows oil to migrate from the metal surface into the polymer matrix so that the melted polymer can absorb surface contamination. In addition it allows the melted compound to conform more readily to the surface. We prefer to use from 10 to 30 wt % based on the formulation of an adhesion promoting resin.

A preferred polymer mixture comprises a first ethylene/n-butyl acrylate copolymer containing 35 wt % n butyl acrylate and having a melt index of 320 (g)/10 min a second ethylene/acrylate copolymer having a melt index of 8 g/10 min, an ethylene/vinyl acetate copolymer containing 28 wt % vinyl acetate and having a melt index of 800 g/10 min, and a hydrocarbon adhesion promoting resin.

For example we have found that a formulation of this invention can have the following properties at the shear rates quoted.

When measured on a parallel disc rheometer at 1% strain. It is preferred that the viscosity is in the range 500 to 1000 Pa·s under 1 $s^{-1}$ shear rate at 90° C. and in the range 100 to 5000 Pa·s under 100 $s^{-1}$ shear rate.

The benefits of the lower viscosity must however be balanced with the ability of the adhesive to retain its shape during the bake phase and to trap the gasses during foaming and to avoid unwanted flow of the molten polymer system during the bake phase at the foaming temperature. Accordingly it is necessary to include ingredients which increase the polymer melt viscosity during the foaming and bake cycle but which do not impair the fluidity required for melt application of the adhesive for example by extrusion. This is accomplished by the inclusion of second cross linking agent. The thixotropic filler is preferably silica particularly useful is fumed silica. Other thixotropic fillers that may be used include polyamide wax, acrylic polymers particularly high molecular weight polymers, layered silicates and modified ureas. We prefer to use treated silica to limit undesired component like air, dust and/or moisture uptake during storage of the formulation and organo silane treated silica is preferred. We have found that from 1 wt % to 15 wt %, preferably 2 wt % to 8 wt % of the filler based on the total weight of the formulation is particularly useful to obtain the desired melt viscosity during the curing bake cycle.

Any suitable cross linking agents having the required activation temperature and crosslinking kinetics at the appropriate temperature may be used. Examples of suitable materials include sulfur cure systems, peroxides, resin cure systems and metallic oxide cure systems. The cross linking system comprises a first cross linking with fast kinetics at low temperature (bake starts, for example a (half life) of less than 30 minutes at 100° C. together with a second cross linking agent having a long (half life) (such as several hours) at a bake start temperature, but a short (half life) when the nominal bake temperature is reached, for example less than 5 minutes at 150° C.

We have found that a combination of benzoyl peroxide (half life at 100° C. of 23.4 minutes) and 1, 1' (di-tertiary-butylperoxide)-3, 3, 5 trimethyl cyclohexane peroxide (half life at 100° C. of 376 minutes, half life at 150° C. 1.3 minutes) is particularly useful. The benzoyl peroxide will decompose first during the bake phase of the adhesive at below the foaming temperature so forming a gel in the molten polymer formulation to increase its viscosity; we have found that up to 0.1 wt % to 5 wt % of benzoyl peroxide based on the weight of the formulation is particularly useful. It may be used in a form that is absorbed on a mineral filer. The 1, 1' (di-tertiary-butyl peroxy-) 3, 3, 5 trimethyl cyclohexane peroxide decomposes more slowly at the activation temperature and quickly at the foaming temperature so that it will consolidate the foam structure, again up to 0.1 wt % to 5 wt % can be used. The cross linking system can also contain an activator for the cross linking agents which can be used to synchronize the cross ink speed with the blowing agent decomposition kinetics. An example of an activator that can be used is bisphenol A diacrylate. The blowing agent will be selected according to the temperature at which foaming is to be accomplished. The blowing agent may be a physical or a chemical blowing agent, a physical blowing agent can comprise a volatile gas trapped in a thermoplastic shell which softens and lets the gas expand at the foaming temperature. However chemical blowing agents which decompose to produce gas on heating such as azodicarbonamide. P toluene sulfide hydrazide (TSH) and pp' oxybis (benzene) sulfonyl hydrozide (OBSH) are preferred and it is preferred to use from 1 to 10 wt % based on the weight of the formulation. The blowing system may also comprise an activator which allows the expansion rate to be synchronized with the cross linking reaction. Zinc oxide is a suitable activator and again from 1 to 10 wt % based on the weight of the formulation may be used.

Accordingly by suitable choice of the cross linking system and the blowing agent system the viscosity of the formulation from application through baking, expansion and cure can be controlled to obtain adequate adhesion, a non tacky material at ambient temperature, a material that retains its shape during the bake phase, a controlled foaming and a foam that retains its structure. Typically excellent adhesion can be accomplished when formulations of the present invention are applied to a substrate at a temperature in the range 70 to 120° C. and the foaming and the foaming and development of adhesive properties are activated at a temperature in the range 140° C. to 220° C. During application it is preferred that the melt viscosity index is from 20 to 80 g 1 10 (10) mins at 90° C. under a 10 kg load.

Other materials that may be incorporated are filers such as calcium carbonate and pigments.

In the preferred use of the adhesive formulations of this invention in automobile manufacture, the ingredients are mixed and fed in an extruder, the extruder heats them to their softening point (between 70° C. and 120° C.), and shapes them in a continuous bead.

The molten bead may then be applied on a car body part which is generally preheated before application, of the adhesive as this can improve the tack of the bead. Pre-heat temperature should be similar to the molten bulk temperature of the adhesive as it is applied. The bead may be applied employing the extrusion techniques described in United States Patent Publication 2006/0127584. After cooling, the part is assembled into the vehicle. The car body assembly goes through the anticorrosion process sometimes known as e-coat. During the e-coat bake, the bead expands, (adheres) and provides a seal between the part and its environment. This can be done for vibration damping or sound deadening or dust and water for sealability purpose.

The invention claimed is:

1. A method for sealing a cavity of an automotive vehicle frame, comprising:

(a) providing a wall associated with an automotive vehicle structure, wherein said wall defines a cavity of an automotive vehicle body in white and is an interior wall surface of a vehicle pillar; and (b) locating an expandable material being a heat activated thermoplastic foamable material by an extruder over at least a portion of said wall and in contact with said wall prior to expansion of said expandable material;

(c) heating the expandable material so that the expandable material foams to form a foamed formulation that is at least 800% of its original volume so that it fills the cavity when exposed to the heat, wherein the heat is provided to the vehicle frame during automotive vehicle production;

wherein the expandable material is prior and after its disposition to said wall dry to the touch at ambient temperature; and wherein the expandable material is a hot melt adhesive formulation comprising:

(i) one or more solid polymers;

(ii) a thixotropic filler;

(iii) a blowing agent system; and (iv) a cross linking system comprising:

a first cross-linking agent having an activation temperature within a temperature range at which the adhesive is heated up to a foaming temperature, but below the foaming temperature to increase a melt viscosity of the expandable material; and a second cross-linking agent with an activation temperature within a range of the foaming temperature to cause the foamed formulation to cross link.

2. The method as claimed in claim 1, wherein said thermoplastic foamable material is an acoustic polymer.

3. The method as claimed in claim 1, wherein said wall includes an exposed surface.

4. The method as claimed in claim 1, wherein said wall is an interior wall of a hollow structural member.

5. The method as claimed in claim 1, wherein said wall is an automotive vehicle body panel or reinforcement member.

6. The method as claimed in claim 1, wherein the expandable material expands to at least 1000% of its original volume.

7. The method as claimed in claim 1, wherein the first cross linking agent has an activation temperature of from about 100° C. to about 130° C.

8. The method as claimed in claim 1, wherein the second cross linking agent has an activation temperature of from about 140° C. to about 180° C.

9. The method as claimed in claim 1, wherein the thermoplastic foamable material includes two ethylene acrylate ester copolymers together with an ethylene vinyl acetate copolymer and an adhesion promoting resin.

10. The method as claimed in claim 1, wherein the thermoplastic foamable material includes an ethylene acrylate copolymer have a melt flow index of 320g/10 min (ISO 1133 190° C., 2.16 kg) combined with an ethylene vinyl acetate copolymer having a melt flow index of 800g/10 min.

* * * * *